(12) United States Patent
Delia et al.

(10) Patent No.: US 11,282,111 B2
(45) Date of Patent: Mar. 22, 2022

(54) LOCATION BASED ADVERTISING SYSTEMS

(71) Applicant: Groupon, Inc., Chicago, IL (US)

(72) Inventors: Brett Delia, West Linn, OR (US); Perry Mason Adair, Bellingham, WA (US)

(73) Assignee: Groupon, Inc., Chicago, IL (US)

( * ) Notice: Subject to any disclaimer, the term of this patent is extended or adjusted under 35 U.S.C. 154(b) by 0 days.

(21) Appl. No.: 16/671,774

(22) Filed: Nov. 1, 2019

(65) Prior Publication Data

US 2020/0065861 A1    Feb. 27, 2020

Related U.S. Application Data

(60) Continuation of application No. 13/655,254, filed on Oct. 18, 2012, now abandoned, which is a division of
(Continued)

(51) Int. Cl.
   *G06Q 30/00* (2012.01)
   *G06Q 30/02* (2012.01)
   (Continued)

(52) U.S. Cl.
   CPC ..... *G06Q 30/0261* (2013.01); *G01C 21/3679* (2013.01); *G06F 16/9535* (2019.01);
   (Continued)

(58) Field of Classification Search
   CPC .......... G06Q 30/0261; G06Q 30/0242; G06Q 30/0266; G06F 16/9537; G06F 16/9538;
   (Continued)

(56) References Cited

U.S. PATENT DOCUMENTS 5,839,088 A    11/1998    Hancock et al.
5,948,040 A     9/1999    Delorme et al.
(Continued)

OTHER PUBLICATIONS

"Assessing the Business Impact of Location Based Services". Rao. IEEE. 2004. (Year: 2004).*
(Continued)

*Primary Examiner* — Maria V Vanderhorst
(74) *Attorney, Agent, or Firm* — Alston & Bird LLP

(57) ABSTRACT

Two directional data exchange between a mobile navigation system and a listing system enables pricing models and analytics that are responsive to trips initiated in response to location based listings on the navigation system. The data exchange may include information to present the listing to the user, track whether the user elected to begin navigating to the destination based on that listing, intermediate status as the user progresses towards the destination, and an indication that the user arrived at the location. The data may be used to evaluate the effectiveness of the listing in bringing customers to a physical location associated with the listing. The data may be applied in a performance-based pricing model by which pricing for the listing is based in full or in part on the number of trips initiated and/or completed as a result of the listing.

20 Claims, 6 Drawing Sheets

Related U.S. Application Data application No. 11/688,761, filed on Mar. 20, 2007, now Pat. No. 8,315,905.

(60) Provisional application No. 60/787,144, filed on Mar. 30, 2006.

(51) Int. Cl.

| | | |
|---|---|---|
| *G01C 21/36* | (2006.01) | |
| *G06F 16/9535* | (2019.01) | |
| *G06F 16/9537* | (2019.01) | |
| *G06F 16/9538* | (2019.01) | |
| *H04H 60/06* | (2008.01) | |
| *H04L 9/40* | (2022.01) | |
| *H04L 67/52* | (2022.01) | |
| *H04L 69/329* | (2022.01) | |
| *G05B 19/418* | (2006.01) | |

(52) U.S. Cl.
CPC ...... *G06F 16/9537* (2019.01); *G06F 16/9538* (2019.01); *G06Q 30/0242* (2013.01); *G06Q 30/0266* (2013.01); *H04H 60/06* (2013.01); *H04L 29/06* (2013.01); *H04L 67/18* (2013.01); *H04L 69/329* (2013.01)

(58) Field of Classification Search
CPC ..... G06F 16/9535; H04H 60/06; H04L 29/06; H04L 67/18; H04L 69/329; G01C 21/3679
See application file for complete search history.

(56) References Cited

U.S. PATENT DOCUMENTS

| | | | |
|---|---|---|---|
| 6,014,090 A | 1/2000 | Rosen et al. | |
| 6,047,236 A | 4/2000 | Hancock et al. | |
| 6,223,122 B1 | 4/2001 | Hancock et al. | |
| 6,266,612 B1 | 7/2001 | Dussell et al. | |
| 6,326,918 B1 | 12/2001 | Stewart | |
| 6,332,127 B1 | 12/2001 | Bandera et al. | |
| 6,339,397 B1 | 1/2002 | Baker | |
| 6,339,744 B1 | 1/2002 | Hancock et al. | |
| 6,343,274 B1 | 1/2002 | Mccollom et al. | |
| 6,343,317 B1 | 1/2002 | Glorikian | |
| 6,347,230 B2 | 2/2002 | Koshima et al. | |
| 6,349,257 B1 | 2/2002 | Liu et al. | |
| 6,349,290 B1 | 2/2002 | Horowitz et al. | |
| 6,353,785 B1 | 3/2002 | Shuman et al. | |
| 6,356,812 B1 | 3/2002 | Cragun | |
| 6,356,838 B1 | 3/2002 | Paul | |
| 6,360,167 B1 | 3/2002 | Millington et al. | |
| 6,370,513 B1 | 4/2002 | Kolawa et al. | |
| 6,370,566 B2 | 4/2002 | Discolo et al. | |
| 6,374,177 B1 | 4/2002 | Lee et al. | |
| 6,381,537 B1 | 4/2002 | Chenault et al. | |
| 6,381,603 B1 | 4/2002 | Chan et al. | |
| 6,505,121 B1 | 1/2003 | Russell | |
| 6,618,593 B1 | 9/2003 | Drutman et al. | |
| 6,714,860 B1 | 3/2004 | Wawra et al. | |
| 6,741,188 B1 | 5/2004 | Miller et al. | |
| 7,071,842 B1 | 7/2006 | James, Jr. | |
| 7,437,240 B2 | 10/2008 | Oumi et al. | |
| 2003/0036848 A1* | 2/2003 | Sheha | G01C 21/3679 701/468 |
| 2003/0189498 A1 | 10/2003 | Kakihara et al. | |
| 2003/0220734 A1 | 11/2003 | Harrison et al. | |
| 2003/0220835 A1 | 11/2003 | Barnes | |
| 2004/0030593 A1 | 2/2004 | Webster et al. | |
| 2004/0186769 A1 | 9/2004 | Mangold et al. | |
| 2004/0203860 A1 | 10/2004 | Fellenstein et al. | |
| 2005/0288859 A1 | 12/2005 | Golding et al. | |
| 2006/0026067 A1 | 2/2006 | Nicholas et al. | |
| 2006/0069503 A1 | 3/2006 | Suomela et al. | |
| 2006/0173841 A1* | 8/2006 | Bill | G01C 21/3492 |
| 2007/0005242 A1* | 1/2007 | Kato | G01C 21/3679 701/467 |
| 2007/0060112 A1 | 3/2007 | Reimer | |
| 2008/0004981 A1 | 1/2008 | Gopalpur et al. | |
| 2008/0139181 A1 | 6/2008 | Lokshin | |
| 2009/0239552 A1 | 9/2009 | Churchill et al. | |

OTHER PUBLICATIONS

Location-based spatial data management in navigation systems. IEEE. (Year: 2002).*
It'll be a wireless, wireless, wireless, wireless, wireless world. James, Dana Marketing News v34n15 pp. 25, 29. Jul. 17, 2000.
McGeough, Jim, Location-Based Services and Topology, "A Database Platform for Location-Based Service Applications", Digital Earth Systems, Inc., Jul. 26, 2001, pp. 1-14.

* cited by examiner

| USER ACTION | NAVIGATION SYSTEM | LISTING SYSTEM |
|---|---|---|
| S1<br>Search for listings | | |
| | S2<br>Request listings from listings system | |
| | | S3<br>Respond with relevant listing information |
| | S4<br>Present listing content to user | |
| S5<br>Elect trip to destination for selected listing | | |
| | S6.1<br>Read destination address | |
| | S6.2<br>Begin navigation routing | |
| | S6.3<br>Transmit trip initiation data to listing system | |
| | | S7<br>Store trip initiation data |
| S8<br>Progress towards destination | | |
| | S9<br>Transmit trip progress data to listing system | |
| | | S10<br>Store trip progress data |
| S11<br>Arrive at destination | | |
| | S12<br>Transmit trip completion data to listing system | |
| | | S13<br>Store trip completion data |

FIG. 7

LOCATION BASED ADVERTISING SYSTEMS

CROSS-REFERENCE TO RELATED APPLICATIONS

This application claims priority to and is a continuation of U.S. Non-Provisional patent application Ser. No. 13/655,254, entitled "Location Based Advertising Systems," filed Oct. 18, 2012, which in turn claims priority to U.S. Non-Provisional application Ser. No. 11/688,761, entitled "Location Based Advertising Systems," filed Mar. 20, 2007 (issued as U.S. Pat. No. 8,315,905 on Nov. 20, 2012), which in turn claims priority to U.S. Provisional Patent Application No. 60/787,144 entitled "Method and system for presenting, tracking, reporting, and analyzing the effectiveness of electronic advertising and fee-for-insertion business listings integrated with electronic navigation systems," filed Mar. 30, 2006. All of the noted parent applications are incorporated herein by reference in their entirety.

BACKGROUND

Electronic navigation systems provide for the identification and tracking of the physical location of a user and are, in many cases, also capable of directing users to a destination of their choice. These systems enable the presentation of a variety of way finding information such as the current physical location of the system user, intermediate waypoints and destination. Navigation systems can use both audio and/or visual methods to guide users to a destination. In addition to stored data relating to the physical environment, these systems may also allow users to locate businesses and points of interest by category, keywords, or through other querying capabilities. The inclusion of a particular business or point of interest in an electronic navigation system may or may not require a business or individual to pay a fee to provide for this inclusion. In addition to passive listings, navigation systems also have the ability to present advertisements to users, potentially allowing them to initiate a trip based on the advertisement.

In general, and unlike traditional media, electronic advertising via the internet, mobile phones or other electronic media have the benefit of being able to record data relating to the audiences' interaction with the advertisement. For example, internet based advertisements in the form of banner advertisements provide for the tracking of whether the advertisement was presented to the user as well as whether the user clicked on that advertisement to view more information about the subject of the advertisement. Advertising pricing models are often based on performance metrics relating to the number of views per advertisement.

BRIEF DESCRIPTION OF THE DRAWINGS

FIG. 7 is a flow diagram illustrating an example system dialog for a trip initiated in response to a location based listing according to the inventive principles of this patent disclosure.

DETAILED DESCRIPTION

Overview

Figure 1:
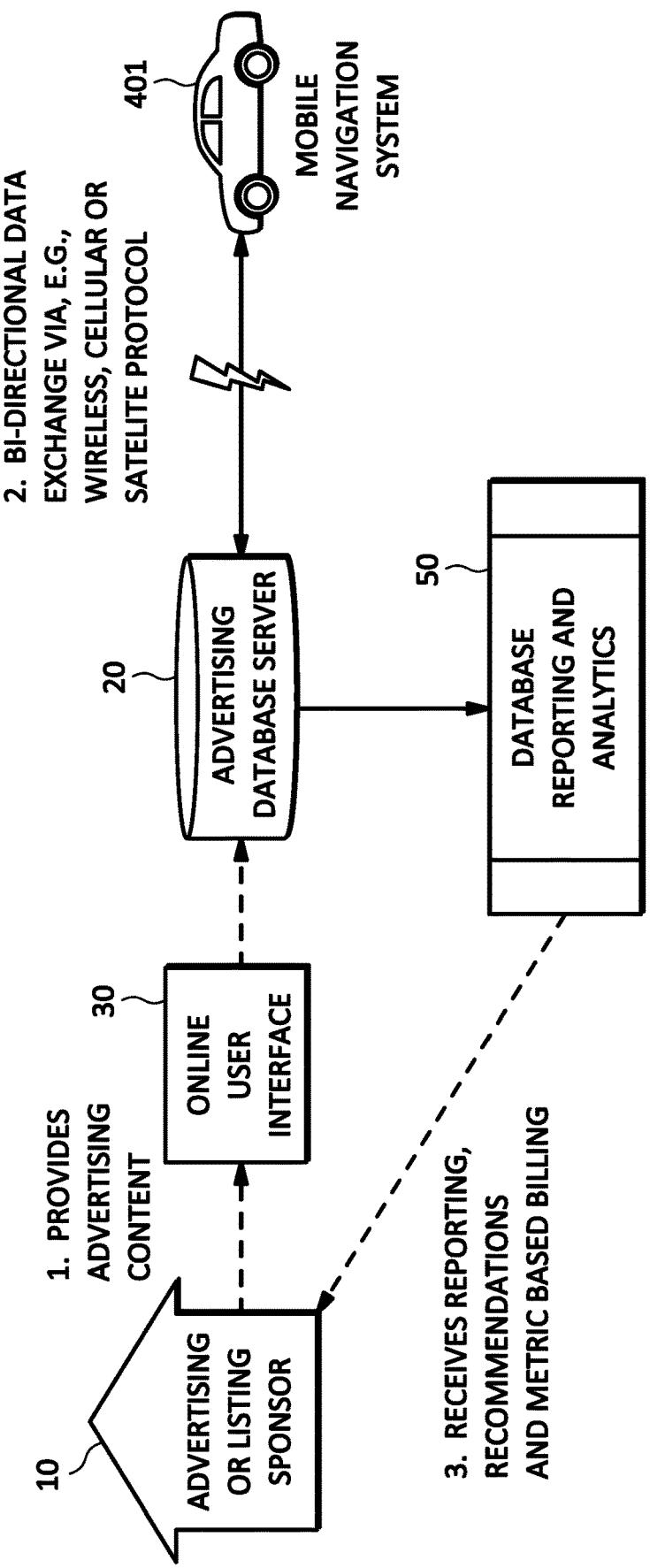
FIG. 1 illustrates an embodiment of a mobile navigation system having location based advertising according to some of the inventive principles of this patent disclosure.

FIG. 1 illustrates an embodiment of a mobile navigation system that implements location based advertising according to some of the inventive principles of this patent disclosure. The embodiment of FIG. 1 enables capturing, reporting and analyzing data associated with advertising and business listings presented via an electronic navigation system. Geographic position-related data is communicated for the purpose of presenting listings to users, advertising analysis, advertising pricing models that are enabled by the communication of this information, and advanced analytics and data mining made possible by the association of this data with a specific advertisement.

Referring to FIG. 1, a business (advertising or listing sponsor) 10 provides location based advertising content to a service provider that maintains a remote database server 20. This content may be provided, for example, through an online user interface 30. When requested by a user, information relating to a business, point of interest, or event is presented on the mobile navigation system 40. The user is also provided the option to initiate a trip based on this listing during which the navigation system directs the user to the destination associated with the listing. Upon initiation of a trip, the navigation system begins transmitting data to a remote database server 20. The transmitted data may include information such as: an indication that the user initiated the trip, distance from the destination at trip origination, time of trip origination, multiple indicators of progress in reaching the destination, deviations from the prescribed route, mid-trip abandonment of the navigation routine, an indication that the user reached the final destination, and time of arrival.

Based on this received data, the service provider that maintains the remote database server may apply database reporting tools 50 in order to generate summary statistics and reports associated with the effectiveness of the navigation based advertising. The reporting of this data may involve a variety of new advertising metrics including: number of trips initiated per listing, number of trips completed per listing, ad-to-trip conversion rate, trip completion rate cost per initiated trip, and cost per delivered guest. The pricing model for the navigation-based advertisements may be based on performance levels measured by one or more of the metrics listed above, or other metrics. Advanced analytics and data mining based on this information are also possible with this system. The types of analysis available include: a physical mapping of the area over which users have traveled to the destination, trouble spots indicating any common areas where users have abandoned the trip, a distribution of trip distances, areas from which trips were initiated, travel distances and time (day, week, season) that trips were initiated. Advertising consulting services may leverage these analyses to present advertising recommendations to businesses 10 that advertise with the service provider and subscribe to the analysis.

The embodiment described above with reference to FIG. 1 is intended to illustrate some of the inventive principles of this patent disclosure. These inventive principles have independent utility and can be implemented in countless different embodiments having various combinations of features. Additional features and details are described below. Although some specific implementation details are shown for purposes of illustrating the inventive principles, other effective arrangements can be devised in accordance with the inventive principles of this patent disclosure. Thus, the inventive principles are not limited to the specific details disclosed herein.

Data Capture User Interface

According to some of the inventive principles of this patent disclosure, a listing sponsor may enter the details of one or more listings via a secure online user interface consisting of a web page or client based software that connects to the internet. Portals to this user interface may be located on the websites of traditional listing partners (i.e. the classifieds submission web page for a local newspaper) to allow customers to submit conventional and navigation-based listings in a single sitting. Data captured during this process may include the name of the business or event, a description of the event, images or other multimedia to enhance the presentation of the listing, the physical location of the business/event, start and end times or opening hours, active duration of the listing, mechanisms such as keywords and categorization to support search capabilities, and other data. Usage scenarios associated with this user interface include the processes of creating a customer account, requesting and processing login credentials, managing customer and user profiles, billing transactions, as well as submitting, reviewing, editing, copying, deleting, and otherwise managing one or multiple listings/advertisements. The user interface may apply user authentication mechanisms to prevent unauthorized access as well as organizational hierarchy permissions to allow organizations with multiple locations to delegate management of listings to individual site users or super-users.

Storage on Advertising Database Server

An advertising database server (listing server) according to some of the inventive principles of this patent disclosure may receive listing submissions from the data capture user interface via encrypted internet protocols (i.e. Secure Sockets Layer). Each listing may be inserted into the database as a single record (row) in a database table, where the columns represent the data submitted via the user interface as well as unique identifiers for the customer, listing, site, and user. This database table may be exclusively dedicated to maintaining listing details.

Navigation Systems, Data Requests, Data Exchange, and Local Data Storage

Navigation systems include hardware and software solutions that leverage global positioning satellites (GPS), cellular triangulation, or other methods of positioning. In order to provide the navigation system with the information necessary to present listings according to some of the inventive principles of this patent disclosure, the navigation system may support one or more mechanisms for downloading data from the advertising database server. The exact details of the outbound data exchange from the advertising database server to the navigation system depend on the nature of the navigation system. Navigation systems differ in terms of the communication protocols they are compatible with, the pervasiveness and availability of communication channels the system may utilize, the way the user requests listings, as well as the capacity of local data storage, all of which affect the way the navigation system communicates with the advertising database server. These differences ultimately determine whether the navigation system downloads listing data in real time based on a user request, or whether the system intermittently downloads batches of data that are then stored locally on the system for retrieval when requested by the user. Any of these approaches are adequate to enable the pricing and analytical models provided by the inventive principles of this patent disclosure.

If a navigation system is capable of receiving inbound data from a satellite, cellular or wireless system in real time, listing data may leverage web services or other data exchange frameworks, allowing the system to request individual listing information in real time. This real time capability reduces the need for local data storage on the navigation system.

If a navigation system is only capable of intermittent communications with the server (i.e. when parked in a home garage near a wireless hotspot), the system may need to download large portions of the listing database for local storage on the navigation system. To reduce the amount of data transferred, the system may only store updates and may further limit downloads to listings within a specific geographic area defined by the user and/or hardware manufacturer or provider of communication channels.

Some navigation systems are based on audio communications and require no visual user interface to be installed with the mobile user. Instead, once the user requests a destination, the directions are fed to the user via audio instructions from a stationary server. The interface between this server and the advertising database server may leverage existing networking models featuring web service data exchange frameworks and XML orchestrations.

Presentation of Listings on Navigation System

The presentation of listings may occur at the request of a user, or may be triggered by certain events, conditions or business rules defined by the listing sponsor according to some of the inventive principles of this patent disclosure. Users may request listings via a category or keyword search. For example, the user may request a listing of all theatres showing a particular movie in the next 45 minutes and be presented with the locations of theatres showing the film (as well as an indication of whether the user will make the start time based on travel time to the destination). Listings may be presented as a result of a specific user query as just described, but may also be presented as they are relevant based on previously defined user criteria (i.e. present listings for events of a favorite category as they happen). Both of these represent a 'pull' model because they are requested by the user. Alternatively, listings may be presented as persistent advertisements on the system's user interface. This represents a push model and may leverage proximity information to determine the optimal presentation time.

Listing-Related Navigation Events

If a user responds to a listing by requesting the system to direct them to a location associated with the listing, several listing-related navigation events may occur and depending on the implementation may trigger a data exchange with the advertising server (or storage for later upload to the server based on navigation system). The exchange may include information such as an indication that the user elected to begin a trip, distance from the destination at trip origination, time of trip origination, multiple indicators of progress in reaching the destination (i.e. 25%, 50%, 95% of route traveled), deviations from the prescribed route, mid-trip abandonment of the navigation routine, an indication that the user reached the final destination, a time of arrival and other information.

Inbound Data Flow from Navigation System to Server

The advertising database server receives uploaded data resulting from listing-related navigation events, and may parse this data into individual records in a database table specifically dedicated to recording navigation related events. Each trip initiation may represent a single record in the database table. Each record may include trip data, a unique listing ID, user demographic information, as well as a hardware system identifier that may be able to flag records associated with the same navigation system and destination as duplicates.

Advertising Metrics

When summary information is requested by the customer (sponsor) or necessary for billing purposes, database reporting software according to some of the inventive principles of this patent disclosure may generate reports by merging data from the customer table, listing table, and trip event data table. The unique listing ID may be used as the primary key for associating the trip metric table and the listing table, and the customer ID may be used as the primary key for associating the customer table and the listing table. The combination of these data sets facilitates the calculation of various navigation-related advertising metrics including the following: Initiation rate—number of trips initiated per listing; delivery rate—number of trips completed per listing; trip success rate—number of trips completed/number of trips initiated; cost per initiated trip—cost of listing/initiation rate; cost per delivered guest—cost of listing/delivery rate; and other useful summary statistics relating to the listing and navigation events associated with that listing that are recorded and stored for later analysis.

Database Reporting and Analytics

Figure 2:
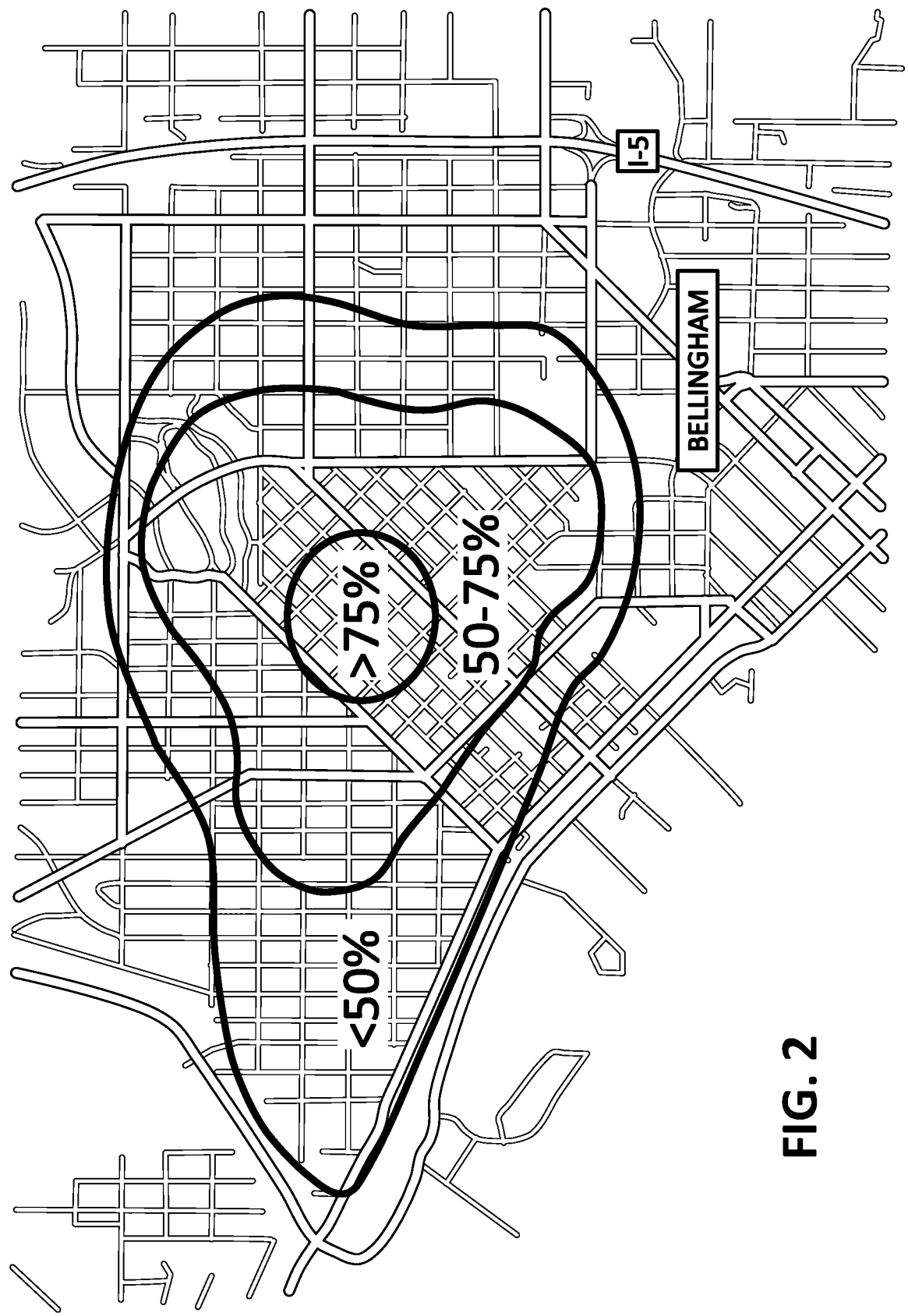
FIG. 2 illustrates a graphical representation of a trip success rate footprint according to some of the inventive principles of this patent disclosure.

In addition to presenting summary statistics relating to the effectiveness of a listing, database software interfacing with geographical information system (GIS) data may provide an additional layer of analysis and interpretation according to some of the inventive principles of this patent disclosure. For example, as shown in FIG. 2, the software may graphically represent a trip success rate footprint which indicates the varying success rates of completing a trip to the destination based on distance from the destination when the trip is initiated. Prospects beginning a trip in one zone (zone area defined by distance formula based on aggregation of data points for locations of trip initiation) may have an average of 75% success in completing the navigation trip to the destination.

Graphical mappings of trip information may be implemented to enable numerous additional features according to some of the inventive principles of this patent disclosure. Mappings of individual or aggregations of trips may be created, and the mappings may present various attributes for the individual or aggregate trips such as: the category or keywords searched to find the listing for a trip, an indication of which of multiple listings the user selected for a trip, time data relating to the trips (e.g., start time, completion time, time of day, date, season, etc.), percentage of the trips completed, demographics of the users making the trips, information on the starting zones of the trips, and/or unique visit information.

In addition to mappings of physical locations, the inventive principles of this patent disclosure enable analytical tools that determine a statistical distribution of trip attributes related to a listing. For example, distributions of the following attributes may be prepared: distances of trips related to a listing, demographics of the users making the trips, starting zones of the trips, and/or travel times related to a listing (where the travel time may be trip duration, time of day, date, etc.).

Moreover, a distribution of trip attributes may be crosstabulated by listing or user attributes. This enables a sponsor to determine, for example, what types of customers arrive in the late afternoon as compared to those who arrive later in the evening, whether they are demographically different, come from different parts of the region, etc.

Summary Reports and Recommendations

Summary reports and advanced analytics according to some of the inventive principles of this patent disclosure may provide insight that can be leveraged by consultants to provide a variety of recommendations. For example, the trip success rate footprint may be useful in identifying the optimal selection of the physical location of conventional media buys and signage (e.g., billboards). Alternatively, if using a 'push' advertising model, the footprint analysis may inform the optimal selection of criteria that govern when, where and to whom advertisements are presented via the navigation system user interface.

Pricing Models

Providers of navigation based advertising services according to some of the inventive principles of this patent disclosure may elect to price their services and bill their customers based on a pricing framework that prices the listings in response to the trips that have been initiated in response to the listings. For example, a service provider may price a listing based on one or more of the following models. Variable—Pay-per-trip: the total listing fee equals the billing rate times the number of completed trips per listing. Variable—Pay-per-initiation: the total listing fee equals the billing rate times the number of initiated trips per listing. Fixed Guarantee—Minimum delivered guest guarantee: a flat fee is charged on the condition of a minimum count of successful trips. Hybrid—Fixed listing fee plus performance: the total listing fee equals a fixed listing fee plus a variable performance fee. The hybrid model enables the service provider to charge a fixed setup fee for each listing so that some of the costs can be recovered even if the listing does not generate any performance-based revenue. Pricing options may also be based on a combination of navigation events and listing information.

Some additional implementation details and pricing models that are possible according to the inventive principles of this patent disclosure are described below.

Pay-Per-Trip.

In this model, pricing is based on a combination of positioning and listing data that indicates that the user has viewed an advertisement or listing and has navigated to a destination as a result of viewing that content. When the user completes or abandons a trip, software on the navigation unit stores this data and ultimately sends a response to the list server. As an example, the navigation unit may send a record with the following fields where fictitious data is included for purposes of illustration:

<System_ID>A45f69754
<User_ID>1043958
<Listing>SFRM-22314553
<Category>Open House
<Start_Position>+45.524968,−122.685007
<Waypoint_1>+45.522387,−122.680808
<Waypoint_2>+45.519788,−122.681850
<Waypoint_n>+##.######,−###.######
<End_Position>+45.516917,−122.678699
<Destination_Position>+45.516919,−122.678698
<Start_Time>11:34:23
<End_Time>11:43:49

This data is then matched with other listing information provided by the customer and service provide in another database in order to execute business rules that determine pricing. This additional listing data may include the pricing model, min/max delivery guarantees, special category, time based or special zone pricing. This model may remove risk and uncertainty for advertisers with regard to the effectiveness of their promotional expenditures. It may also enable more precise budgeting and business forecasting.

Many variations on a pay-per trip model are possible. For example, the listing may be priced based on the number of trips initiated per listing, the number of trips completed, and/or the number of trips partially completed. With partially completed trips, the pricing may be prorated based, for example, on the percentage of the total trip distance the user traveled. Also, multiple pricing models may be combined.

Arrival Zone.

An arrival zone may be implemented as a simple binary parameter to indicate whether a user has completed a trip in response to a location based listing. E.g., if the user enters the arrival zone, the trip is complete. Alternatively, the details of an arrival zone may form all or part of the basis for a pricing model. An arrival zone may be defined as circle having a radius which is the distance in any direction from the destination in which the user will be considered to have arrived once the user enters this perimeter. The radius may relate to pricing when customers have the ability to define the arrival zone radius. Generally, a larger arrival zone radius corresponds to a lower expense to deliver a user.

The arrival zone may provide a rough approximation of when a trip is complete. Since the appropriate radius may vary by customer, the arrival zone may be customizable. Customers having large parking lots, or customers in locations where users must park further away and walk to the final destination (such as shopping malls where the user must travel long distances indoors or outdoors) would not be able to track trips with a smaller radius.

Starting Zone.

A starting zone may be implemented to enable pricing based on the starting position of a trip related to the listing. For example, the price may be based on the size of the starting zone, location of the starting zone or the demographics of the starting zone. Smaller starting zones are more specific and therefore more valuable and expensive. Starting zones may enable a sponsor to target demographics based on neighborhoods from which they want to grow their customer base.

Broadcast Radius.

A broadcast radius is the distance in any direction from the destination in which a listing is presented to a user. The listing itself may change in priority based on broadcast radius—it may be listed at the top of a list of search results or in a premium broadcast zone, and so fourth. This parameter allows the listing sponsor as opposed to the user to control the zones in which a listing is visible. It may be useful to manage overlaps in territories between franchises/branches so as not to present competing listings. Discounts may be offered on a smaller than standard broadcast radius.

Time-limited Listings.

With this pricing model, the delivery fee may be less expensive depending on what time the user is delivered at the location in relation to the expiration time of the listing. For example, if a user arrives 10 minutes before an event is over the value of that user is less than if they were there from the beginning (depending on the type of event/business).

Distance Premiums.

With this pricing model, the price for a delivered user may vary based on the distance traveled, as measured by the difference between starting position and destination. This model is based on the idea that customers who navigate to the destination from further away may be more valuable because they would be less likely to have found the destination on their own or be exposed to alternative promotions for the destination.

Peak Hours/Days.

In this model, customer delivery fees for off peak times (or for when the system has fewer listings) can be discounted to encourage/reward listing sponsors who submit listings for certain times of the day. These discounts can be pre-defined for known off-peak periods or demand based as a function of the number of listings or user trips at that time. This model may provide added value because some businesses value customer visits differently based on the time of day. Also, in the interest of always having content to present to users, a service provider may want to offer extra encouragement to sponsors who have listings at slow times of the day.

Non-Linear Pricing Scale.

In a non-linear pricing model, pricing may not be tied linearly to the number of delivered customers and may instead scale exponentially, logarithmically, or have tiers, ceilings and floors, or vary dynamically based on real time demand data. This type of model may add simplicity and predictability to the pricing model, and/or reflects the possibility that the value of the first delivered customer may not be equal to the last delivered customer.

Dynamic Price Points.

With this pricing model, the cost of a delivered customer may either increase or decrease after each subsequent delivery. This model also reflects the possibility that the value of the first delivered customer may not be equal to the last delivered customer.

Share of Visits.

With this pricing model, customer delivery fees may vary dynamically based on the share of customers delivered during a specific time window. For example, if ten percent of all user trips in a certain area and time period went to one listing, the fee would be different for a listing that only drew one percent.

Price Ceiling.

With this pricing model, the listing stops being shown after specific number of completed trips—sponsors are billed for all deliveries except those that exceed the ceiling. This model may add simplicity and predictability to the pricing model, and/or it may reflect the possibility that the value of the first delivered customer may not be equal to the last delivered customer.

Tiered Pricing.

This pricing model associates a single price for a range of number of deliveries. Thresholds may be established based on number of delivered customers at which the next pricing tier is reached. This may simplify the pricing model.

Unique Visitor Pricing.

With this pricing model, special billing for new customers who have never navigated there before based on a unique identifier in the hardware or application—uniqueness can be by customer, specific stores (if customer has multiple locations) or the specific listing.

Pooled Pricing.

This pricing model involves sharing costs between multiple locations—the number of total trips based on a listing that has multiple locations but is otherwise identical can be aggregated and the costs shared between the various locations. This model may help address franchised operations that have overlapping local footprints. The sponsor may not want to present the user with two competing listings for franchises in the same chain. Pooling may allow a service provider to present the nearest or easiest franchise location to get to and allow the franchises to share the costs of the listing.

Target Origin Pricing.

In this model, special pricing may be offered for a listing if a responsive trip is initiated in a specific area. The area may be established, for example, as a specific address or geographic coordinates with a starting radius around address of coordinates. This model may be especially valuable if tied to the location of outdoor advertising or other trigger, or to a strategic area for the advertiser. It may also be tied to an advertising campaign in the specific location. When users are located in the target area, the service provider may increase the visibility of the listing on the mobile navigation unit. Trips initiated in these zones may be priced differently than those initiated in other areas.

Quotas.

This model allows a sponsor to set a target number of visits on which the sponsor may price the listing. For example, the higher the target number, the less the service provider gets paid per delivered customer (fixed price quota), but if target number is exceeded, then the sponsor pays the service provider a premium.

Category Pricing.

With this model, the listing fee may vary depending on the category the user searched to find the listing. The price may be based upon the number of searches, listings, or trips within a category that set the price, or some other more subjective criteria. In one embodiment, listings may have multiple categorical associations, each with different prices, but the price is only based upon the category that the user ultimately used to find the listing. Some categories may have higher demand and/or traffic rates than others, so if one customer visit is based on a listing that was found in a more general category and another customer visit is based on the same listing that was found through a more specific category, the listing for the trip found through the more specific category may be less expensive. This is valuable as a pricing variable because the user looking in a more specific category knows more exactly what to look for, and thus, it is easier for the service provider to convert the user to a completed trip.

Hardware and Software Implementations

Although the pricing models, analytical tools and other inventive principles described above do not depend on any particular hardware or software implementations, some possible hardware and software arrangements according to the inventive principles of this patent disclosure are described below.

Figure 3:
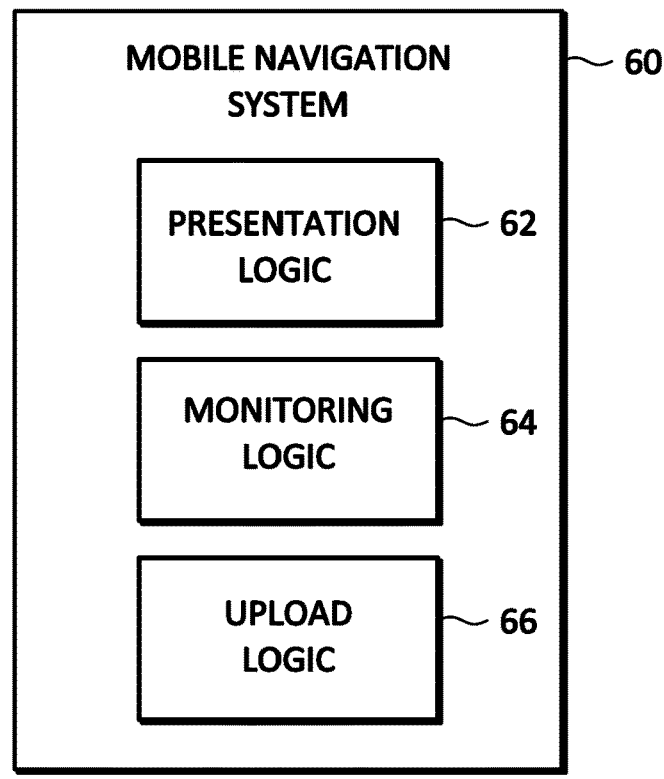
FIG. 3 illustrates an embodiment of a mobile navigation system according to some of the inventive principles of this patent disclosure.

FIG. 3 illustrates an embodiment of a mobile navigation unit 60 according to some of the inventive principles of this patent disclosure. The embodiment of FIG. 3 may be implemented by modifying an existing platform such as any of the commercially available vehicle-mounted navigation units currently available, whether integrated into the vehicle or added on as an aftermarket feature, mobile smart phones, or personal digital assistants (PDAs). Alternatively, the unit may be built on a custom platform specifically designed to accommodate the pricing models, analytical tools and other inventive principles of this patent disclosure.

The mobile navigation unit 60 of FIG. 3 includes presentation logic 62 to present a location-based listing to a user, monitoring logic 64 to monitor a trip related to the listing, and upload logic 66 to transmit information on the trip to a service provider. The logic used to implement the various functions of the navigation unit may be implemented using dedicated hardware, software running on a processor, or any suitable combination of hardware, software, firmware, etc. For example, an existing mobile navigation platform may have a flexible hardware architecture with a graphical display module, a GPS interface, and a wireless telephony interface that can be controlled through application software running on a general purpose processor. With such an architecture, the presentation logic, monitoring logic, and upload logic may be implemented entirely in software that may be shipped with the unit, downloaded wirelessly as a plug-in, installed using a wired interface, etc. The software for implementing the logic may be stored on any machine readable medium. Alternatively, the logic may be implemented as a hardware package that may be installed as an add-on to an existing navigation unit.

The presentation logic, monitoring logic, and upload logic may implement any of the pricing models, analytical tools and other inventive principles described above. For example, the monitoring and upload logic may transmit any of the following trip information to the service provider: an indication that the user initiated a trip in response to a listing, the location of the trip origin, time of the trip origin, information on progress of the trip, deviations from a prescribed route, abandonment of the trip, a trip completion indicator, etc. The monitoring logic may include logic to implement an arrival zone. The system may also include download logic to receive the location-based listings from the service provider, and business rules may be downloaded with the listings. For example, the business rules may govern accessibility of the listing to the user, e.g., when, where and to whom the listing is accessible.

The presentation logic may include logic to present real time information relating to the listing. For example, software on the service provider's listing server may tally the number of users responding to an event listing and broadcast this information in real time to other navigation units in the vicinity to provide the users with information on the popularity of the event.

Figure 4:
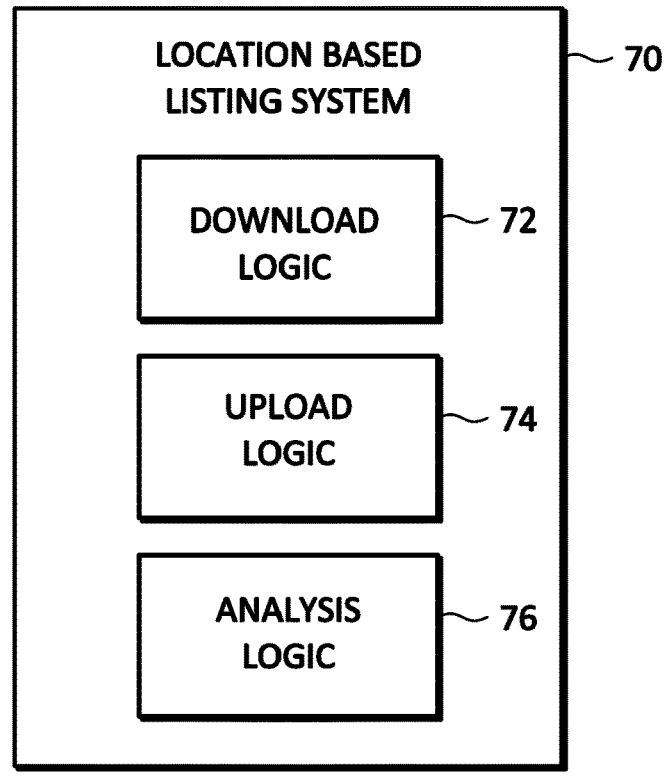
FIG. 4 illustrates an embodiment of a location based listing system according to some of the inventive principles of this patent disclosure.
Figure 5:
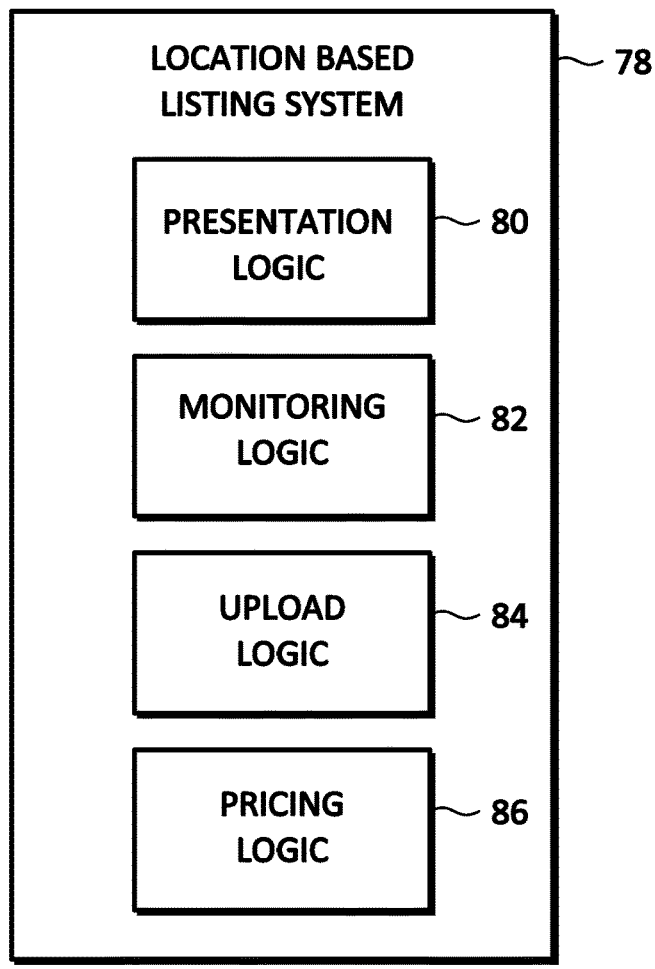
FIG. 5 illustrates another embodiment of a location based listing system according to some of the inventive principles of this patent disclosure.

FIGS. 4 and 5 illustrate example embodiments of location based listing servers 70 and 78 according to some of the inventive principles of this patent disclosure. The embodiments of FIGS. 4 and 5 may be implemented by modifying an existing platform or it may be built on a custom platform specifically designed to accommodate the pricing models, analytical tools and other inventive principles of this patent disclosure.

The listing server 70 of FIG. 4 includes download logic 72 to transmit a location-based listing to a mobile navigation system, upload logic 74 to receive information on a trip related to the listing from the mobile navigation system, and analysis logic 76 to analyze the information on the trip. The listing server 78 of FIG. 5 also includes download, upload and analysis logic 80, 82 and 84, and further includes pricing logic 86. As with the mobile navigation unit described above, the logic used to implement the various functions of the listing server may be implemented using dedicated hardware, software running on a processor, or any suitable combination of hardware, software, firmware, etc.

The download logic, upload logic, analysis logic and other logic included in the system may implement any of the pricing models, analytical tools and other inventive principles described above. For example, the logic may perform any of the following functions: price the listing in response to the trip, charge a sponsor for the listing in response to the price determined in response to the trip, evaluate the effectiveness of the listing, generate reports on the effectiveness of the listing, enable a sponsor to submit a location-based listing to the system, either through a dedicated portal or through a portal to a conventional listing interface, transmit real time information relating to the listing to the mobile navigation system, transmit business rules for each listing to the mobile navigation system, etc.

The listing servers of FIGS. 4 and 5 may include logic to implement persistent location based listings such as business locations, or time-limited listings such as entertainment or sales events. The server may also include logic to implement real-time feedback such as popularity metrics to users as discussed above.

Logic may also be included to implement functions related arrival zones. For example, a sponsor may define an arrival zone for each listing as a simple indicator of whether a user has completed a trip. In this case, a listing sponsor may customize the size of the arrival zone for the environment of the business location. If the business has a large parking lot or its customers are likely to park far away and walk, the sponsor may designate a large arrival zone. On the other hand, if the sponsor only wants to consider a trip completed if the customer drives very close to the location, then a small arrival zone radius may be selected.

Alternatively, arrival zones may be used as an integral part of the pricing model. For example, a larger arrival zone may be less expensive per delivered customer than a smaller one and, therefore, the service provider may charge slightly less to deliver a user to a wider arrival zone because the rate of competed trips the service provide can charge for goes up when the arrival zone is larger. Thus, a flexible arrival zone may be core to any pricing & analytics of completed trips.

Figure 6:
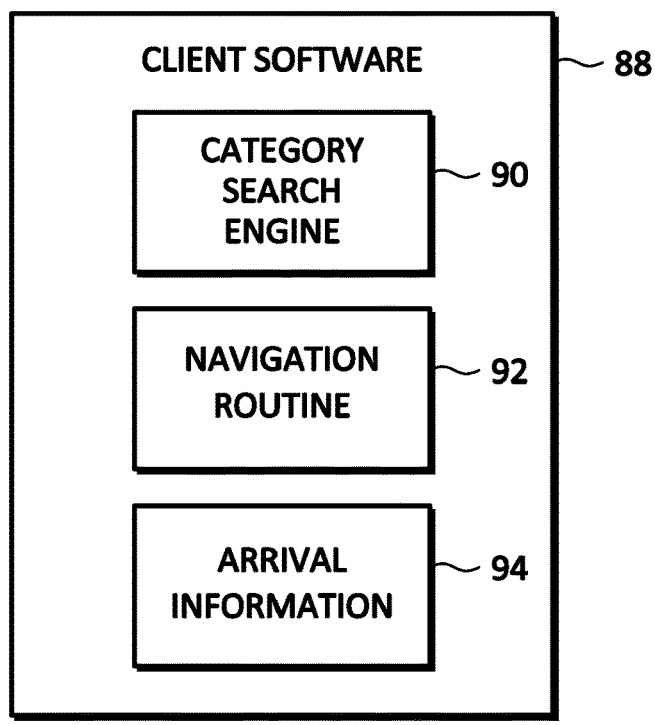
FIG. 6 illustrates an embodiment of a client software structure for a mobile navigation system according to some of the inventive principles of this patent disclosure.

FIG. 6 illustrates an example embodiment of a client software structure for a mobile navigation system according to some of the inventive principles of this patent disclosure. The software is embodied as an application 88 running on a mobile device platform. The application includes a category search routine 90 to implement functions that enable the device to request and return business and event listings from a listing server, as well as request and return more specific information from the server after the user has selected a business or event listing. A navigation routine 92 implements conventional navigation functions to guide a user to a location, as well as functions that return position data to the listing system as the user progresses towards the location. Arrival routine 94 implements functions associated with the user's arrival at a location such as reporting the user's arrival to the listing system, displaying arrival promotions to the user, etc.

Example Data Exchange

FIG. 7 is a flow diagram illustrating an example system dialog for a trip initiated in response to a location based listing according to the inventive principles of this patent disclosure. This example is intended to illustrate some of the inventive principles, and although some specific implementation details are shown for purposes of illustration, the inventive principles are not limited to the specific details set forth in this example.

The dialog begins at step S1 where the user of the mobile navigation system searches for a location based listing. The user may search by category, keyword, or other search criteria. At S2, the navigation system requests listings relating to the user search criteria from the listing server. At S3, the listing server responds by sending relevant content to the navigation unit. The content may include system readable data relating to physical location and, as applicable, the start time of the event, the location closing hours, etc. At S4, the navigation unit presents the listing content to the user. Based on the user's current location relative to the destination and information on event start time or store closing time, the navigation unit indicates whether the user will be able to make it to the destination prior to these time indicators.

At S5, the user elects to begin navigating to a destination associated with a listing. At S6.1, the navigation unit reads destination address detail from the selected listing content and begins a navigation routine at S6.2. At S6.3, the navigation unit transmits data to the listing server indicating that the user has initiated a trip based on the listing along with the time the trip was initiated, distance from the destination and a unique identifier for the listing. At S7, the listing server stores the trip information in a database record associated with the listing and listing sponsor.

As the user progresses towards the destination (S8), the navigation unit transmits progress information to the listing server along with a timestamp for the progress information and the unique identifier for the listing (S9). As the trip progresses, the listing server stores trip progress information in the database record associated with the listing and the sponsor (S10).

At S11, the user arrives at the destination. The navigation unit transmits an indicator that the user has arrived at the destination to the listing server along with the unique identifier for the listing (S12). At S13, the listing server then stores trip completion information in the database record associated with the listing and listing sponsor.

Figure 8:
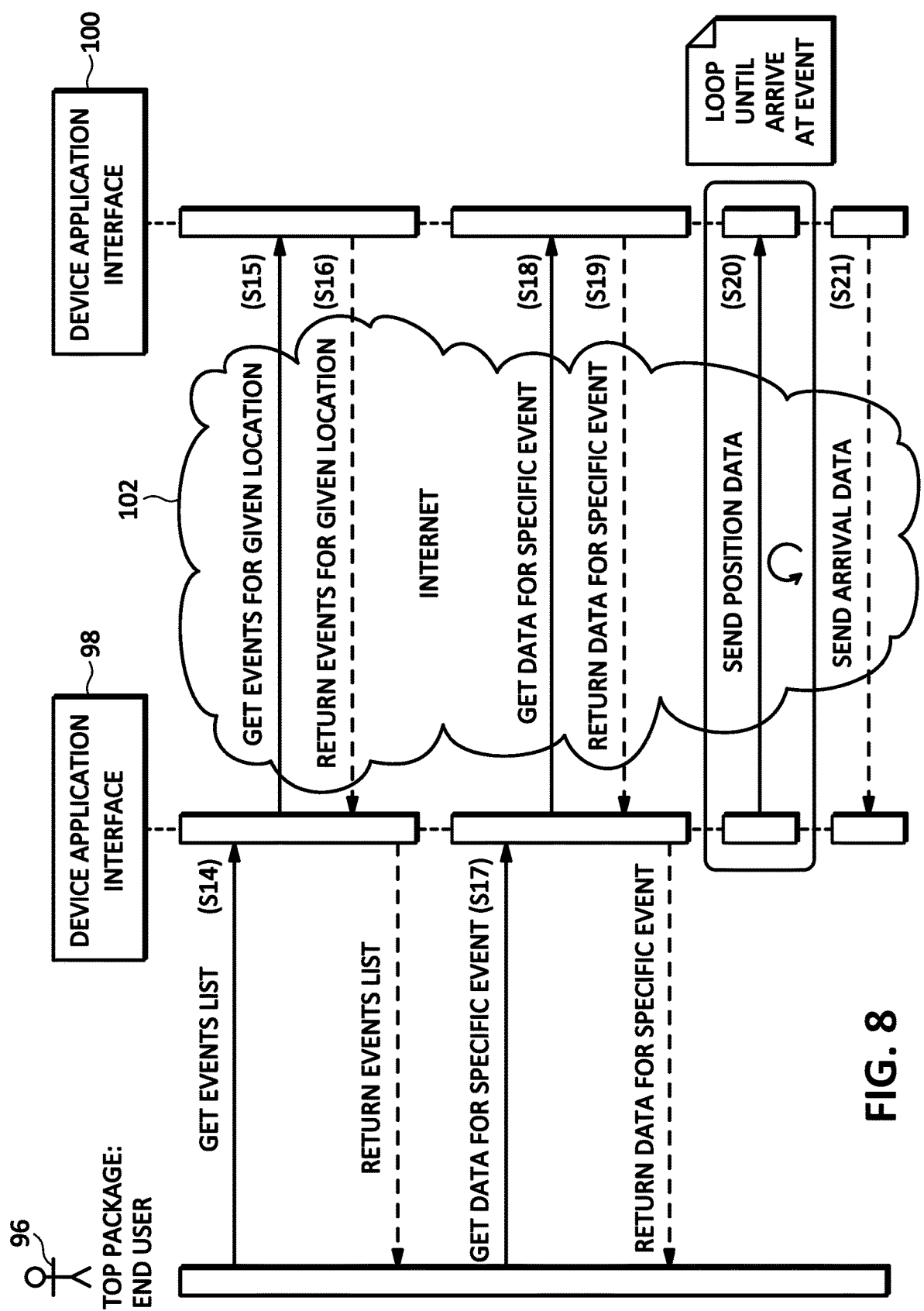
FIG. 8 is a pictorial sequence diagram illustrating an example system dialog for a trip initiated in response to a location based listing according to the inventive principles of this patent disclosure.

FIG. 8 is a pectoral sequence diagram illustrating an example system dialog for a trip initiated in response to a location based listing according to the inventive principles of this patent disclosure. The example of FIG. 8 illustrates a trip related to an event listing, but the inventive principles are equally applicable to trips related to other types of listings such as a retail store location or other point of interest. In the diagram of FIG. 8, a client-side device application interface 98 implements the functionality to enable a user 96 to interact with a mobile navigation unit. A server side device application interface 100 implements the functionality to interface the listing server to the mobile device. In this example, the communication between the mobile device and listing system occurs through the Internet which is frequently illustrated as a "cloud" 102 due to its distributed and amorphous nature, but other communication infrastructures may be employed. The sequence of events follows a downward direction in FIG. 8 to illustrate the progression of time.

The example of FIG. 8 begins at S14 when the user requests a list of events related to a specific location. This triggers the client-side device application interface 98 to request events (S15) from the server-side device application interface 100 which returns a list of events for the given location (S16). At S17, the user selects an event. As S18, the client-side device application interface requests event specific data from the listing server which returns the data at S19. The device application interfaces implement a loop 101 at S20 in which position data is repeated transmitted to the server-side device application interface as the user progresses toward the event. When the user arrives at S21, any relevant arrival data is transmitted to the client-side device application interface which may present, e.g., an arrival promotion to the user.

The inventive principles described above leverage the synergies between physical business locations, electronic advertisements for these businesses, and the ability of navigation systems to guide users to user-selected destinations and communicate user navigation events. Prior art systems implemented in existing technology feature the presentation of advertising and business listings on navigation systems, but do not enable the pricing and analytical business models described in this patent disclosure. In particular, the exchange of trip related data to a database that is capable of associating these trip events with an advertisement and the sponsor of that advertisement for the purposes of advertising analysis according to the inventive principles of this patent disclosure enables the robust and flexible business models described above.

Additional Embodiments

The inventive principles of this patent disclosure can be modified in arrangement and detail in accordance with the inventive concepts. The following additional examples are just some of the myriad variations possible in accordance with the inventive principles.

In some embodiments, a method comprises: providing location-based listings to a user through a mobile navigation system; monitoring trips related to the listings; and pricing the listings in response to the trips.

The listing may be priced based on the number of trips related to the listing. The number of trips related to a listing may include the number of trips initiated per listing, the number of partially completed trips per listing, the number of trips completed per listing, etc. The price for a partially completed trip may be related to the percentage of trip distance completed by the user. A trip may be considered completed if the user enters an arrival zone.

The method may further comprise customizing the arrival zone for a destination. The price for a completed trip may depend on the size of the arrival zone. For example, the price for a completed trip may be greater for a smaller arrival zone.

A listing may be priced based on unique visitor pricing, share-of-visits pricing, pooled pricing, popularity of an event associated with the listing (which may be presented to the user), the length of a trip related to the listing, the starting position of a trip related to the listing, a starting zone in which the starting position is located, the size of the starting zone, the location of the starting zone, the demographics of the starting zone, the time of day during which a trip related to a listing is made, or the date on which a trip related to a listing is made. A listing may be priced based on a guaranteed minimum number of trips related to a listing, a fixed listing fee plus a fee based on the effectiveness of a listing, a combination of trip events and listing information, the time a trip related to a listing is made in relation an expiration time of the listing, a category in which the user accesses a listing, or the demographics of the user.

A listing that is priced based on the number of trips related to the listing may be priced on a nonlinear pricing scale, a tiered pricing scale, a scale having a price ceiling, a scale having a quota of trips related to the listing, or a scale having a minimum traffic trigger.

The method may further comprise charging a sponsor for the listings in response to the trips.

In other embodiments, a method comprises: transmitting location-based listings from a service provider to a mobile navigation system; presenting the listings to a user through the mobile navigation system; monitoring trips related to the listings; transmitting trip event information from the mobile navigation system to the service provider; and pricing the listings in response to the trip event information. The trip event information may be transmitted from the mobile navigation system to the service provider in real time or in batch mode.

In other embodiments a method comprises: a step for presenting location-based listings to a user on a mobile navigation system; a step for monitoring trips related to the listings; and a step for pricing the listings in response to the trips. The step for monitoring may comprise initiating a data exchange between the mobile navigation system and a service provider if the user initiates a trip related to a listing.

In some embodiments, a method comprises: presenting location-based listings to a user through a mobile navigation system; monitoring trip events related to the listings; and analyzing the trip events to evaluate the effectiveness of the listings. Analyzing the trip events may comprise determining: the number of trips initiated per listing, the number of trips completed per listing, a listing-to-trip conversion rate, a trip completion rate, a cost per initiated trip, or a cost per delivered user.

Analyzing the trip events may comprise mapping a region over which one or more users have traveled in response to the listings. The mapping may comprise individual trips, and the method may further comprise presenting attributes for individual trips. The mapping may comprise aggregations of trips, and the method may further comprise presenting attributes for aggregations of trips. The attributes may include the category searched to find the listing for a trip, an indication of which of multiple listings the user selected for a trip, the times of the trips, a percentage of the trips completed, the demographics of the users making the trips, information on the starting zones of the trips, or unique visit information.

Analyzing the trip events may comprise identifying trouble spots for trips related to a listing, or determining a distribution of trip attributes related to a listing. The trip attributes may include distances of trips related to a listing, the demographics of the users making the trips, starting zones of the trips, or travel times related to a listing. The travel times may comprise trip durations, times of day, or dates. The method may further comprise cross-tabulating a distribution of trip attributes by user or listing attributes.

The method may further comprise advising a sponsor based on the analysis of the trip events. Advising a sponsor may comprise advising a sponsor on location based listings, or advising a sponsor on placement of conventional media.

In another embodiment, a method comprises: transmitting location-based listings from a service provider to a mobile navigation system; presenting the listings to a user through the mobile navigation system; monitoring trips related to the listings; transmitting information relating to trip events that are associated with a listing from the mobile navigation system to the service provider; and analyzing the trip events to evaluate the effectiveness of the listings. The trip event information may be transmitted from the mobile navigation system to the service provider in real time or batch mode.

In another embodiment, a method comprises: a step for presenting location-based listings to a user on a mobile navigation system; a step for monitoring trips related to the listings; and a step for analyzing the trip events to evaluate the effectiveness of the listings. The step for monitoring may comprise initiating a data exchange between the mobile navigation system and a service provider if the user initiates a trip related to a listing.

In some embodiments, a mobile navigation system comprises: presentation logic to present a location-based listing to a user; monitoring logic to monitor a trip related to the listing; and upload logic to transmit information on the trip to a service provider. The information on the trip may include an indication that the user initiated a trip in response to a listing, the location of the trip origin, the time of the trip origin, information on progress of the trip, information on deviations from a prescribed route, information on abandonment of the trip, an indication of completion of the trip, or the time of completion of the trip.

The monitoring logic may comprise logic to implement an arrival zone. The system may further comprise download logic to receive the location-based listings from the service provider, or rule logic to implement business rules for each listing. The business rules may be downloaded with the listing and may govern accessibility of the listing to the user. The presentation logic may comprise logic to present real time information relating to the listing. The real time information includes popularity information. The upload logic may comprise real time logic to enable the transmission the information on the trip in real time or in batch mode.

In another embodiment, a machine readable medium comprises executable code to cause a mobile navigation system to: present a location-based listing to a user; monitor a trip related to the listing; and transmit information on the trip to a service provider. The medium may further comprise executable code to cause the mobile navigation system to receive the location-based listing from the service provider, or to implement business rules received with the listing.

In another embodiment, a method comprises: presenting a location-based listing to a user on a mobile navigation system; monitoring a trip related to the listing; and transmitting information on the trip to a service provider. The method may further comprise receiving the location-based listing from the service provider or implementing business rules received with the listing.

In some embodiments, a system comprises: download logic to transmit a location-based listing to a mobile navigation system; upload logic to receive information on a trip related to the listing from the mobile navigation system; and logic to analyze the information on the trip. The logic to analyze the information on the trip may include logic to price the listing in response to the trip. The system may further comprise logic to charge a sponsor for the listing in response to the price determined in response to the trip. The logic to analyze the information on the trip may include logic to evaluate the effectiveness of the listing, and the system may further comprise logic to generate reports on the effectiveness of the listing. The location-based listing may comprise a persistent listing, which may include information relating to a business location. The location-based listing comprises a time-limited listing, which may include information relating to an event.

The system may further comprise logic to enable a sponsor to submit a location-based listing to the system through a conventional listing interface, or to transmit real time information relating to the listing to the mobile navigation system. The real time information may include popularity information. The system may further comprise logic to transmit business rules for each listing to the mobile navigation system, to enable a sponsor to define a starting zone for each listing, or to enable a sponsor to define an arrival zone for each listing.

In other embodiments, a machine readable medium comprises executable code to cause a location-based listing system to: transmit a location-based listing to a mobile navigation system; receive information on a trip related to the listing from the mobile navigation system; and analyze the information on the trip. The medium may further comprise executable code to the cause the location-based listing system to price the listing in response to the information on the trip, to cause the location-based listing system to evaluate the effectiveness of the listing, or to cause the location-based listing system to enable a sponsor to submit a location-based listing to the system through a portal in a conventional listing interface.

In other embodiments, a method comprises: transmitting a location-based listing to a mobile navigation system; receiving information on a trip related to the listing from the mobile navigation system; and analyzing the information on the trip. The method may further comprise pricing the listing in response to the information on the trip, or evaluating the effectiveness of the listing in response to the information on the trip.

Since the inventive principles of this patent disclosure can be modified in arrangement and detail without departing from the inventive concepts, such changes and modifications are considered to fall within the scope of the following claims.

The invention claimed is:

1. A database server for enabling prioritized display of a plurality of location markers in a mobile navigation application executing on a client device, the database server comprising a processor and a memory, the memory comprising instructions that configure the database server to:

receive, from a client-side interface operating on the client device, a listing request, wherein the listing request is generated by the mobile navigation application in response to a listing search action by an end-user of the mobile navigation application and transmitted to the client-side interface by the mobile navigation application, and wherein the listing request indicates a starting zone of the client device;

for each location marker of the plurality of location markers,
  retrieve a trip success rate footprint for an arrival zone of the location marker, the trip success rate footprint indicating a historical success rate of completed trips to the arrival zone by a plurality of other users based at least in part on distance from the location marker when each trip is initiated;
  determine a listing score for the location marker based on the trip success rate footprint for the arrival zone of the location marker and the starting zone of the client device,
  retrieve, from a listing server, a broadcast radius for the location marker, wherein the broadcast radius indicates a premium broadcast radius or an ordinary broadcast radius, and wherein the broadcast radius is selected by a listing sponsor associated with the location marker, and
  determine a display score for the location marker based on the listing score for the location marker and the broadcast radius for the location marker;
generate user interface data defining a dynamic ordering of at least some of the plurality of location markers, wherein the dynamic ordering is determined based on each display score for a location marker of the plurality of location markers;
transmit the user interface data to the client-side interface, wherein the client-side interface is configured to transmit the user interface data to the mobile navigation application and the mobile navigation application is configured to display a search result user interface based on the user interface data;
receive, from the client-side interface, a selection indication associated with a first location marker of the plurality of location markers, wherein the selection indication is generated based on a selection action by the end-user of the mobile navigation application and transmitted to the client-side interface by the mobile navigation application, and wherein the selection action is performed as an interaction with the search result user interface;
receive, from the client-side interface, one or more instances of trip progress data associated with a trip from the starting zone for the client device to the arrival zone of the first location marker, wherein the trip progress data is transmitted to the client-side interface by the mobile navigation application;
receive, from the client-side interface, trip completion data indicating that the client device has entered the arrival zone;
determine one or more trip attributes based at least in part on completed trips to the arrival zone by the plurality of other users;
retrieve, from the listing server and based at least in part on the one or more trip attributes, promotion data associated with the location marker;
provide a promotion indication to the client-side interface for presentation via the user interface; and
update the trip success rate footprint for the arrival zone of the first location marker based on the one or more instances of trip progress data, the trip completion data, the starting zone of the client device, and the arrival zone of the client device.

2. The database server of claim 1, wherein the memory comprising instructions further configure the database server to:
generate at least one effectiveness advertising metric based on navigation information related to the first location marker, wherein generating at least one effectiveness advertising metric comprises graphically mapping the trip success rate footprint for the arrival zone of the first location marker.

3. The database server of claim 2, wherein generating at least one effectiveness advertising metric comprises determining a number of trips initiated per location marker, a number of trips completed per location marker, a listing-to-trip conversion rate, a trip completion rate, a cost per initiated trip, or a cost per delivered user.

4. The database server of claim 2, wherein generating at least one effectiveness advertising metric comprises further mapping a region over which one or more users have traveled in response to a location-based advertisement listings.

5. The database server of claim 1, wherein the memory comprises instructions that configure the database server to:
determine a completion period by identifying trouble spots on a navigation path associated with the trip.

6. The database server of claim 5, wherein determining the completion period comprises determining a distribution of trip attributes related to the trip.

7. The database server of claim 1, wherein the memory comprising instructions further configure the database server to:
generate a sponsor-specific report based on the analysis of the trip progress data, wherein the sponsor-specific report comprises information associated with location-based advertisement listings or placement of conventional media.

8. A computer-implemented method for enabling prioritized display of a plurality of location markers in a mobile navigation application executing on a client device, the computer-implemented method comprising, by a database server:
receiving, from a client-side interface operating on the client device, a listing request, wherein the listing request is generated by the mobile navigation application in response to a listing search action by an end-user of the mobile navigation application and transmitted to the client-side interface by the mobile navigation application, and wherein the listing request indicates a starting zone of the client device;
for each location marker of the plurality of location markers,
  retrieving retrieve a trip success rate footprint for an arrival zone of the location marker, the trip success rate footprint indicating a historical success rate of completed trips to the arrival zone by a plurality of other users based at least in part on distance from the location marker when each trip is initiated;
  a trip success rate footprint for an arrival zone of the location marker, the trip success rate footprint indicating a historical success rate of completed trips to the arrival zone based at least in part on distance from the location marker when each trip is initiated,
  determining a listing score for the location marker based on the trip success rate footprint for the arrival zone of the location marker and the starting zone of the client device,
  retrieving, from a listing server, a broadcast radius for the location marker, wherein the broadcast radius indicates a premium broadcast radius or an ordinary broadcast radius, and wherein the broadcast radius is selected by a listing sponsor associated with the location marker, and determining a display score for the location marker based on the listing score for the location marker and the broadcast radius for the location marker;

generating user interface data defining a dynamic ordering of at least some of the plurality of location markers, wherein the dynamic ordering is determined based on each display score for a location marker of the plurality of location markers;

transmitting the user interface data to the client-side interface, wherein the client-side interface is configured to transmit the user interface data to the mobile navigation application and the mobile navigation application is configured to display a search result user interface based on the user interface data;

receiving, from the client-side interface, a selection indication associated with a first location marker of the plurality of location markers, wherein the selection indication is generated based on a selection action by the end-user of the mobile navigation application and transmitted to the client-side interface by the mobile navigation application, and wherein the selection action is performed as an interaction with the search result user interface;

receiving, from the client-side interface, one or more instances of trip progress data associated with a trip from the starting zone for the client device to the arrival zone of the first location marker, wherein the trip progress data is transmitted to the client-side interface by the mobile navigation application;

receiving, from the client-side interface, trip completion data indicating that the client device has entered the arrival zone;

determining one or more trip attributes based at least in part on completed trips to the arrival zone by the plurality of other users;

retrieving, from the listing server and based at least in part on the one or more trip attributes, promotion data associated with the location marker;

providing a promotion indication to the client-side interface for presentation via the user interface; and updating the trip success rate footprint for the arrival zone of the first location marker based on the one or more instances of trip progress data, the trip completion data, the starting zone of the client device, and the arrival zone of the client device.

9. The computer-implemented method of claim 8, further comprising, by the database server:

generating at least one effectiveness advertising metric based on navigation information related to the first location marker, wherein generating at least one effectiveness advertising metric comprises graphically mapping the trip success rate footprint for the arrival zone of the first location marker.

10. The computer-implemented method of claim 9, wherein generating the at least one effectiveness advertising metric comprises determining a number of trips initiated per location marker, a number of trips completed per location marker, a listing-to-trip conversion rate, a trip completion rate, a cost per initiated trip, or a cost per delivered user.

11. The computer-implemented method of claim 9, wherein generating the at least one effectiveness advertising metric comprises further mapping a region over which one or more users have traveled in response to a location-based advertisement listings.

12. The computer-implemented method of claim 8, further comprising:

determining a completion period by identifying trouble spots on a navigation path associated with the trip.

13. The computer-implemented method of claim 12, wherein determining the completion period comprises determining a distribution of trip attributes related to the trip.

14. The computer-implemented method of claim 8, further comprising, by the database server:

generating a sponsor-specific report based on the analysis of the trip progress data, wherein the sponsor-specific report comprises information associated with location-based advertisement listings or placement of conventional media.

15. A computer program product for enabling prioritized display of a plurality of location markers in a mobile navigation application executing on a client device, the computer program product comprising at least one non-transitory computer-readable storage medium having computer-readable program code portions stored therein, the computer-readable program code portions configured to cause a database server at least to:

receive, from a client-side interface operating on the client device, a listing request, wherein the listing request is generated by the mobile navigation application in response to a listing search action by an end-user of the mobile navigation application and transmitted to the client-side interface by the mobile navigation application, and wherein the listing request indicates a starting zone of the client device;

for each location marker of the plurality of location markers, retrieve a trip success rate footprint for an arrival zone of the location marker, the trip success rate footprint indicating a historical success rate of completed trips to the arrival zone by a plurality of other users based at least in part on distance from the location marker when each trip is initiated;

determine a listing score for the location marker based on the trip success rate footprint for the arrival zone of the location marker and the starting zone of the client device, retrieve, from a listing server, a broadcast radius for the location marker, wherein the broadcast radius indicates a premium broadcast radius or an ordinary broadcast radius, and wherein the broadcast radius is selected by a listing sponsor associated with the location marker, and determine a display score for the location marker based on the listing score for the location marker and the broadcast radius for the location marker;

generate user interface data defining a dynamic ordering of at least some of the plurality of location markers, wherein the dynamic ordering is determined based on each display score for a location marker of the plurality of location markers;

transmit the user interface data to the client-side interface, wherein the client-side interface is configured to transmit the user interface data to the mobile navigation application and the mobile navigation application is configured to display a search result user interface based on the user interface data;

receive, from the client-side interface, a selection indication associated with a first location marker of the plurality of location markers, wherein the selection indication is generated based on a selection action by the end-user of the mobile navigation application and transmitted to the client-side interface by the mobile navigation application, and wherein the selection action is performed as an interaction with the search result user interface;

receive, from the client-side interface, one or more instances of trip progress data associated with a trip from the starting zone for the client device to the arrival zone of the first location marker, wherein the trip progress data is transmitted to the client-side interface by the mobile navigation application;

receive, from the client-side interface, trip completion data indicating that the client device has entered the arrival zone;

determine one or more trip attributes based at least in part on completed trips to the arrival zone by the plurality of other users;

retrieve, from the listing server and based at least in part on the one or more trip attributes, promotion data associated with the location marker;

provide a promotion indication to the client-side interface for presentation via the user interface; and update the trip success rate footprint for the arrival zone of the first location marker based on the one or more instances of trip progress data, the trip completion data, the starting zone of the client device, and the arrival zone of the client device.

16. The computer program product of claim 15, wherein the computer-readable program code portions are further configured to cause the database server at least to:

generate at least one effectiveness advertising metric based on navigation information related to the first location marker, wherein generating at least one effectiveness advertising metric comprises graphically mapping the trip success rate footprint for the arrival zone of the first location marker.

17. The computer program product of claim 16, wherein generating at least one effectiveness advertising metric comprises determining a number of trips initiated per location marker, a number of trips completed per location marker, a listing-to-trip conversion rate, a trip completion rate, a cost per initiated trip, or a cost per delivered user.

18. The computer program product of claim 16, wherein generating at least one effectiveness advertising metric comprises further mapping a region over which one or more users have traveled in response to a location-based advertisement listings.

19. The computer program product of claim 15, further comprising: determining a completion period by identifying trouble spots on a navigation path associated with the trip.

20. The computer program product of claim 19, wherein determining the completion period comprises determining a distribution of trip attributes related to the trip.

* * * * *